(12) United States Patent
Costas et al.

(10) Patent No.: US 6,679,928 B2
(45) Date of Patent: *Jan. 20, 2004

(54) POLISHING COMPOSITION HAVING A SURFACTANT

(75) Inventors: Wesley D. Costas, Bear, DE (US); Tirthankar Ghosh, Oreland, PA (US); Jinru Bian, Newark, DE (US); Karel-Anne Valentine, Elkton, MD (US)

(73) Assignee: Rodel Holdings, Inc., Wilmington, DE (US)

( * ) Notice: Subject to any disclaimer, the term of this patent is extended or adjusted under 35 U.S.C. 154(b) by 48 days.

This patent is subject to a terminal disclaimer.

(21) Appl. No.: 10/121,887

(22) Filed: Apr. 12, 2002

(65) Prior Publication Data

US 2002/0189169 A1 Dec. 19, 2002

Related U.S. Application Data

(60) Provisional application No. 60/283,282, filed on Apr. 12, 2001.

(51) Int. Cl.⁷ .............. C09C 1/68; C09D 1/00; C09G 1/02; C09G 1/04
(52) U.S. Cl. ............. 51/307; 51/308; 51/309; 51/298; 106/3; 438/690; 438/692; 438/693
(58) Field of Search ............ 51/307, 308, 309, 51/298; 106/3; 438/692, 693, 690; 216/88, 89; 252/79.4

(56) References Cited

U.S. PATENT DOCUMENTS

| 4,752,628 | A | | 6/1988 | Payne |
| 5,391,258 | A | | 2/1995 | Brancaleoni et al. |
| 5,417,832 | A | * | 5/1995 | Pellegrino et al. .......... 204/296 |
| 6,046,110 | A | * | 4/2000 | Hirabayashi et al. ....... 438/693 |
| 6,060,395 | A | | 5/2000 | Skrovan et al. |
| 6,568,997 | B2 | * | 5/2003 | Costas et al. ................. 451/41 |

FOREIGN PATENT DOCUMENTS

| EP | 0747939 A | 12/1996 |
| EP | 0 913 442 A2 | 5/1999 |
| EP | 1020488 A | 7/2000 |

* cited by examiner

*Primary Examiner*—Michael Marcheschi
(74) *Attorney, Agent, or Firm*—Gerald K. Kita; Edwin Oh

(57) ABSTRACT

A polishing composition for polishing a semiconductor substrate has a pH of under 5.0 and comprises (a) a carboxylic acid polymer comprising polymerized unsaturated carboxylic acid monomers having a number average molecular weight of about 20,000 to 1,500,000 or blends of high and low number average molecular weight polymers of polymerized unsaturated carboxylic acid monomers, (b) 1 to 15% by weight of an oxidizing agent, (c) up to 3.0% by weight of abrasive particles, (d) 50–5,000 ppm (parts per million) of an inhibitor, (e) up to 3.0% by weight of a complexing agent, such as, malic acid, and (f) 0.1 to 5.0% by weight of a surfactant.

16 Claims, No Drawings

POLISHING COMPOSITION HAVING A SURFACTANT

CROSS REFERENCE TO RELATED APPLICATIONS

This application claims the benefit of provisional application Ser. No. 60/283,282 filed Apr. 12, 2001.

FIELD OF THE INVENTION

The invention relates to a polishing composition for chemical mechanical planarization, CMP, to remove a metal layer from a semiconductor substrate, further described as, a semiconductor wafer.

BACKGROUND OF THE INVENTION

Large numbers of semiconductor devices are built from different materials that are successively deposited in successive layers on a wafer of silicon, which provides a semiconductor substrate. The semiconductor devices include semiconductor circuit elements and electrically conducting circuits, further described as, interconnects. The interconnects comprise metal in trenches of precise dimensions. The trenches are recessed in a surface of a dielectric layer on the wafer, also known as, an interlayer. The trenches are manufactured according to known photolithographic etching processes. A barrier film is deposited over the underlying dielectric layer and the trenches. The metal that fills the trenches to provide the interconnects is applied as a layer of metal that is deposited on the underlying barrier film.

CMP is a process performed with a moving polishing pad applied with a downforce against the layer of metal, while an aqueous polishing composition is interposed between the polishing pad and the surface being polished. The layer of metal is removed by a combination of abrasion and chemical reaction. CMP is performed to remove the layer of metal from the underlying barrier film, while minimizing removal of the metal in the trenches, thus, minimizes dishing of the interconnects. Dishing is a name applied to recesses that result from undesired removal of some of the metal in trenches by the CMP operation. Excessive dishing comprises defects in the interconnects.

According to EP 0 913 442, a polishing composition is provided with polyacrylic acid to minimize removal of metal in trenches during CMP, thus, minimizing dishing.

A polishing composition is desired to minimize removal of metal in trenches during CMP, while maximizing a removal rate of the metal layer during CMP.

SUMMARY OF THE INVENTION

The invention resides in a polishing composition, further described as, an aqueous composition, for polishing a semiconductor substrate with both the aqueous composition and a polishing pad applying a downforce, to remove metal from an underlying barrier film on the semiconductor substrate, the aqueous composition comprising:

a pH no higher than 5, an oxidizer of the metal at said pH to provide ions of the metal, a complexing agent to dissolve the ions, a carboxylic acid polymer reactive with the metal while the polishing pad applies a relatively higher downforce on the metal in a metal layer on the underlying barrier film, to provide a relatively high removal rate of the metal layer, the carboxylic acid polymer being reactive with the metal in trenches while the polishing pad applies a relatively lower downforce on the metal in trenches, which tends to provide a relatively high removal rate of the metal in trenches, and a combination of a metal corrosion inhibitor and a surfactant, which adsorbs on the metal in trenches on which the relatively lower downforce is applied, to minimize the removal rate of the metal in trenches, as would tend to be provided by the carboxylic acid polymer and the applied downforce without the combination of the metal corrosion inhibitor and the surfactant.

The terminology, surfactant, is interpreted to mean, a surface active agent that adsorbs to a surface and lowers a surface tension of a liquid on the surface. According to an embodiment, a surfactant comprises, an anionic surfactant as distinguished from a cationic surfactant, and as distinguished from a neutral charge surfactant.

According to another embodiment, a surfactant comprises, a sulfonate surfactant comprised of molecules having at least six carbon atoms, as distinguished from a sulfonate comprising molecules having an insufficient number of carbon atoms to exist as a polymer in the polishing composition.

According to another embodiment, a surfactant comprises, an alkali metal organic sulfonate.

According to another embodiment, the aqueous composition comprises, a pH under 5.0 and, (a) a carboxylic acid polymer comprising polymerized unsaturated carboxylic acid monomers having a number average molecular weight of about 20,000 to 1,500,000 or blends of high and low number average molecular weight polymers of polymerized unsaturated carboxylic acid monomers, (b) 1 to 15% by weight of an oxidizing agent, (c) up to 3.0% by weight of abrasive particles, (d) 50–5,000 ppm (parts per million) of a corrosion inhibitor, (e) up to 3.0% by weight of a complexing agent, such as, malic acid, and (f) 0.1 to 5.0% by weight of a surfactant.

DETAILED DESCRIPTION

A polishing composition according to the invention can be used with conventional polishing equipment, known polishing pads and techniques to polish semiconductor wafers having copper circuits that result in clearing of a layer of excess copper from the surface of the wafer with a substantial reduction in dishing of the copper circuits of the wafer. The polishing composition provides a substantially planar surface that is free from scratches and other defects that commonly result from polishing.

The polishing composition is an aqueous composition that has a pH under 5.0 and preferably has a pH of 2.8 to 4.2 and more preferably, a pH of 2.8 to 3.8.

The polishing composition contains 1–15% by weight of an oxidizing agent that serves as an oxidizer of the metal at a pH lower than 5.0. Appropriate oxidizing agents are hydrogen peroxide, iodates, such as, potassium iodate, nitrates, such as, cesium nitrate, barium nitrate, ammonium nitrate, mixtures of ammonium nitrate and cesium nitrate, carbonates, such as, ammonium carbonate, persulfates, such as, ammonium and sodium persulfate, and perchlorates. For example, the polishing composition contains about 5–10% by weight of an oxidizing agent. Preferably, the polishing composition contains about 9% by weight of hydrogen peroxide as the oxidizing agent.

The composition contains up to 3.0% by weight and preferably, 0.1–1.0% by weight of a complexing agent, such as, a dissolved carboxylic acid having two or more carboxyl groups and having a hydroxyl group as disclosed in U.S. Pat. No. 5,391,258. An appropriate complexing agent includes straight chain mono- and dicarboxylic acids and their salts, such as, malic acid and malates, tartaric acid and tartarates, gluconic acid and gluconates, citric acid and citrates, malonic acid and malonates, formic acid and formates, lactic acid and lactates. Polyhydroxybenzoic acid, phthalic acid and salts thereof also can be used. During CMP, the oxidizing agent serves as an oxidizer of the metal at said pH under 5.0 to provide ions of the metal. The complexing agent dissolves the ions, while the polishing pad applies downforce and abrasion to the metal being polished. As a result, the metal layer is removed from the underlying barrier film.

The polishing composition contains 50 to 5,000 ppm (parts per million) of an inhibitor preferably BTA (benzotriazole), or TTA (tolyltriazole) or mixtures thereof. Other inhibitors that can be used are 1-hydroxybenzotriazole, N-(1H-benzotriazole-1-ylmethyl) formamide, 3,5-dimethylpyrazole, indazole, 4-bromopyrazole, 3-amino-5-phenylpyrazole, 3-amino-4-pyrazolecarbonitrile, 1-methylimidazole, Indolin QTS and the like. It is known that the inhibitor, for example, benzotriazole (BTA), adsorbs on the surface of a metal, for example, copper, to inhibit corrosion of the metal, for example, by exposure of the metal to the atmosphere. The inhibitor tends to lower a tendency for the oxidizer of the metal to provide ions of the metal.

The aqueous composition comprises, a carboxylic acid polymer, which maximizes the removal rate of the metal during CMP. It is believed that the carboxylic acid polymer is reactive on the metal similarly as particle abrasives are reactive on the metal, in transferring energy from a polishing pad to the copper metal, which removes the copper metal at an increased removal rate during CMP.

Advantageously, the aqueous composition provided with the carboxylic acid polymer removes or minimizes copper metal residuals on an underlying barrier film. Residuals refers to spots of the metal remaining on the underlying barrier film after completion of a CMP cycle.

A further embodiment of the polishing composition is provided with, up to 3% by weight of abrasive particles. According to a further embodiment, from 0.01% up to 3% by weight of abrasive particles are present. Appropriate abrasive particles are those that are appropriately used in CMP polishing of semiconductors, such as, alumina, silica, ceria, germania, diamond, silicon carbide, titania, zirconia, boron nitride, boron carbide and various mixtures of any of the above. The aqueous composition comprises, a carboxylic acid polymer, which increases the removal rate of the metal during CMP, to a maximum beyond the removal rate provided by the abrasive particles in the absence of the carboxylic acid polymer.

One of the disadvantages of an aqueous composition provided with the carboxylic acid polymer, is that the carboxylic acid polymer is reactive with the metal in trenches, which tends to provide a relatively high removal rate of the metal in trenches, despite the polishing pad applying a relatively lower downforce on the metal in trenches. The high removal rate of the metal in trenches would cause unwanted dishing.

An embodiment of the aqueous composition comprises, a combination of a metal corrosion inhibitor and a surfactant, which adsorbs on the metal in trenches on which the relatively lower downforce is applied, to minimize the removal rate of the metal in trenches, as would tend to be provided by the carboxylic acid polymer in the absence of the combination of the metal corrosion inhibitor and the surfactant.

The terminology, surfactant, is interpreted to mean, a surface active agent that adsorbs to a surface and lowers a surface tension of a liquid on the surface. According to an embodiment, a surfactant comprises, an anionic surfactant as distinguished from a cationic surfactant, and as distinguished from a neutral charge surfactant.

According to another embodiment, a surfactant comprises, a sulfonate surfactant comprised of molecules having at least six carbon atoms, as distinguished from a sulfonate comprising molecules having an insufficient number of carbon atoms to exist as a polymer in the polishing composition.

According to another embodiment, a surfactant comprises, an alkali metal organic sulfonate. An embodiment of the polishing composition contains 0.1–5% by weight of an alkali metal organic sulfonate surfactant. Preferably, the alkali metal of the alkali metal organic sulfonate surfactant is selected from sodium, potassium and lithium and the organic group is an aliphatic group having 2–16 carbon atoms. One preferred surfactant is sodium octane sulfonate. Other useful surfactants are potassium octane sulfonate, lithium octane sulfonate and sodium dodecyl sulfonate.

Appropriate other anionic surfactants include, sulfates, phosphates and carboxylates in place of or in combination with the aforementioned sulfonate surfactants.

It is theorized that a combination of the corrosion inhibitor and the surfactant provides a relatively large reduction in metal removal rate with relatively small reductions in downforce applied by the polishing pad on the metal being polished. Where the metal layer is relatively higher in elevation than the metal in trenches, the downforce is relatively higher, and the metal removal rate is maximized by the polishing composition having the combination of the corrosion inhibitor and the surfactant. Where the metal layer is relatively low in elevation, including the metal in trenches being relatively low in elevation, the downforce is relatively lower, and the combination of a metal corrosion inhibitor and a surfactant, adsorbs on the metal in trenches on which the relatively lower downforce is applied, to minimize the removal rate of the metal in trenches, as would tend to be provided by the carboxylic acid polymer and the applied downforce without the combination of the metal corrosion inhibitor and the surfactant. Thus, dishing is minimized due to the minimized removal rate of the metal in trenches. Further, the higher elevations are removed at a higher removal rate than that of the lower elevations, which means that planarization is attained quickly during a CMP operation. Planarization refers to a smooth, planar polished surface with minimized elevation differences on the polished semiconductor substrate, as provided by CMP.

For example, BTA as the corrosion inhibitor would cover the metal layer with a monomolecular layer or multimolecular layer film of BTA, in the absence of the surfactant. The combination of the corrosion inhibitor with the surfactant adsorbs to provide a disturbed film of BTA, due to competing adsorption of both the corrosion inhibitor and the surfactant. The relatively higher downforce removes the disturbed film of BTA, while a relatively lower downforce slowly removes the disturbed film of BTA.

The polishing composition may further contain pH buffers, such as, amines, and may contain surfactants, deflocculants, viscosity modifiers, wetting agents, cleaning agents and the like.

The following description refers to sources of the carboxylic acid polymer. The polishing composition contains about 0.05–2.0% by weight, based on the weight of the composition, of a carboxylic acid polymer comprising, polymerized unsaturated carboxylic acid monomers having a number average molecular weight of about 20,000 to 1,500,000. The number average molecular weight is determined by GPC (gel permeation chromatography). Appropriate embodiments comprise, blends of high and low number average molecular weight carboxylic acid polymers. These carboxylic acid polymers are either, in solution, or in the form of an aqueous dispersion. Appropriate unsaturated carboxylic acid monomers include, unsaturated monocarboxylic acids and unsaturated dicarboxylic acids and water soluble acid salts as the source of such acids. Appropriate unsaturated monocarboxylic acid monomers contain 3–6 carbon atoms, and comprise, acrylic acid, oligomeric acrylic acid, methacrylic acid, crotonic acid and vinyl acetic acid. Appropriate unsaturated dicarboxylic acids include the anhydrides thereof, which contain 4–8 carbon atoms, and comprise, for example, maleic acid, maleic anhydride, fumaric acid, glutaric acid, itaconic acid, itaconic anhydride, and cyclohexene dicarboxylic acid.

Further embodiments comprise, poly(meth)acrylic acids having a number average molecular weight of about 20,000 to 150,000, preferably 25,000 to 75,000 and more preferably, 25,000 to 40,000. Blends of high and low number average molecular weight poly(meth)acrylic acids comprise further embodiments. In such blends or mixtures of poly(meth)acrylic acids, a low number average molecular weight poly(meth)acrylic acid of 20,000 to 100,000 and preferably, 20,000 to 40,000 is in a combination with a high average poly(meth)acrylic acid having a number average molecular weight of 200,000 to 150,000, preferably 150,000 to 300,000. Appropriately, the weight ratio of the low number average molecular weight poly(meth)acrylic acid to the high number average molecular weight poly(meth)acrylic acid is 10:1 to 1:10, preferably 4:1 to 1:4, and more preferably 2:1 to 1:2.

An embodiment comprises, a polyacrylic acid having a number average molecular weight of about 30,000 and a polyacrylic acid having a number average molecular weight of about 250,000 in a 1:1 weight ratio.

The term "poly(meth)acrylic acid", as used herein, means, polymers of acrylic acid or polymers of methacrylic acid. According to an embodiment, very low number average molecular weight poly(meth)acrylic acid polymers are present in the aforementioned blend. Examples of such polymers are poly(meth)acrylic acid polymers having a number average molecular weight of 1,000 to 5,000.

According to an embodiment, the aqueous composition is provided with high carboxylic acid containing copolymers and terpolymers, in which the carboxylic acid component comprises 5–75% by weight of the polymer. An appropriate polymer comprises one of, polymers of (meth)acrylic acid and acrylamide or methacrylamide; polymers of (meth) acrylic acid and styrene and other vinyl aromatic monomers; polymers of alkyl (meth)acrylates (esters of acrylic or methacrylic acid) and a mono or dicarboxylic acid, such as, acrylic or methacrylic acid or itaconic acid; polymers of substituted vinyl aromatic monomers having substituents, such as, halogen, i.e., chlorine, fluorine, bromine, nitro, cyano, alkoxy, haloalkyl, carboxy, amino, amino alkyl and a unsaturated mono or dicarboxylic acid and an alkyl (meth) acrylate; polymers of monethylenically unsaturated monomers containing a nitrogen ring, such as, vinyl pyridine, alkyl vinyl pyridine, vinyl butyrolactam, vinyl caprolactam, and an unsaturated mono or dicarboxylic acid; polymers of olefins, such as, propylene, isobutylene, or long chain alkyl olefins having 10 to 20 carbon atoms and an unsaturated mono or dicarboxylic acid; polymers of vinyl alcohol esters, such as, vinyl acetate and vinyl stearate or vinyl halides, such as, vinyl fluoride, vinyl chloride, vinylidene fluoride or vinyl nitriles, such as, acrylonitrile and methacrylonitrile and an unsaturated mono or dicarboxylic acid; polymers of alkyl (meth) acrylates having 1–24 carbon atoms in the alkyl group and an unsaturated monocarboxylic acid, such as, acrylic acid or methacrylic acid.

A further embodiment comprises an aqueous composition provided with polymers that are degradable, for example, biodegradable or photodegradable. An example of such a composition that is biodegradable is a polyacrylic acid polymer containing segments of poly(acrylate co methyl 2-cyanoacrylate).

The following are appropriate polishing pads that can be used with the polishing composition of this invention to polish copper containing semiconductors: a metals pad described in Roberts et al. U.S. Pat. No. 6,022,268, issued Feb. 8, 2000, a polishing pad containing particles for polishing described in Cook et al. U.S. Pat. No. 5,489,233, issued Feb. 6, 1996, a polishing pad of polymer impregnated fiber matrices sold by Rodel Inc. under the trade name "SUBA", a pad of a polymer sheet containing void spaces formed by in situ production or incorporation of hollow fill materials (appropriate of such a pad are those sold by Rodel Inc. under the trade names "POLITEX" and "IC 1010"), a pad of polymer sheets containing solid particles that are added as fillers that may optionally contain void spaces, effected either by in situ production or by incorporation of hollow filler materials (appropriate of such pads are those sold by Rodel Inc. under the trade name "MH"), and a composite pad of multiple layers of materials whose outer substrate that contacts the surface of the semiconductor being polished is one of the pads selected from the above.

The following examples illustrate the invention. All parts and percentages are on a weight basis and unless otherwise indicated and molecular weights are determined by gel permeation chromatography unless otherwise indicated.

EXAMPLE 1

The following polishing compositions were prepared:
Control Polishing Composition The polishing composition was prepared by thoroughly blending together the following constituents: 0.3 parts benzotriazole, 0.22 parts malic acid, 0.36 parts of polymethacrylic acid polymer blend, 9.0 parts hydrogen peroxide and with deionized water to bring the total parts of polishing composition to 100. The polymethacrylic acid polymer blend is a 50:50 mixture of polymethacrylic acid having a number average molecular weight of 30,000 and polymethacrylic acid having a number average molecular weight of 250,000.

Polishing Composition 1 (0.25% surfactant)—identical to the above control composition except that "Bio-terge" PAS-8s (aqueous composition containing 37.8% by weight sodium octane sulfonate surfactant manufactured by Stepan Company, Northfield, Ill.) was blended with the control composition to form a polishing composition containing 0.25% surfactant.

Polishing Composition 2 (0.50% surfactant)—identical to the above control composition except that sufficient "Bio-terge" PAS-8s was blended with the control composition to form a polishing composition containing 0.50% surfactant.

Polishing Composition 3 (0.75% surfactant)—identical to the above control composition except that sufficient "Bio-terge" PAS-8s was blended with the control composition to form a polishing composition containing 0.75% surfactant.

Polishing Composition 4 (1.00% surfactant)—identical to the above control composition except that sufficient "Bio-terge" PAS-8s was blended with the control composition to form a polishing composition containing 1.00% surfactant.

Test for Removal Rate of Copper from an Electroplated Copper Sheet Wafer

Wafer tested—sheet wafer of silicon dioxide having 200 mm trenches filled with electroplated copper.

Test Pad—IC 1000 XY/SP pad manufactured by Rodel Inc. having large grooving XY, pitch ½ inch, A21.

Tool used for test—Applied Materials Mira polishing machine.

The CDE copper thickness on the wafer was measured. The resistivity of the copper wafer was determined and based on calibration curves, the film thickness of the copper layer was calculated.

The wafer was polished with the above prepared control polishing composition using the following polishing parameters and upon completion of polishing, the CDE thickness of the polished wafer was measured and the copper removal rate was determined:

Down force 5 psi (351.5 g/cm$^2$)

Platen speed—93 rpm

Carrier Speed—87 rpm

Slurry Flow—250 ml/min

A separate wafer as described above was polished under the same conditions with each of the above prepared Polishing Compositions 1–4. The results are shown below in Table 1 for each of the polishing compositions. The following rating system was used to show residual copper remaining on the wafer:

10—completely clear, no trace of residual copper remaining on the wafer including no trace of copper "slivers" on the edge of the wafer (i.e., copper cannot be seen on the wafer except in the features of the wafer).

9—no copper residual found anywhere in the die areas (the active regions of the wafer or areas of the wafer having the copper patterns). There can be copper residual found outside the die areas (e.g., on the very edge of the wafer there may be some copper "slivers" found).

8—very faint copper residuals found in the dies. Usually needs an optical microscope to observe these residuals.

7—copper residual is clearly observed in some of the dies. Observation with naked eye shows significant copper residual, especially near the edge of the wafer.

6—thick copper residual on edge of wafer. Some parts of the die are completely covered with a thick layer of copper.

TABLE 1

| Polishing Composition | Copper Removal Rate Angstroms/Min. | Residual Copper on Wafer |
|---|---|---|
| Control Composition (0% Surfactant) | 4100 | 9 |
| Composition No. 1 (0.25% Surfactant) | 4300 | 9 |
| Composition No. 2 (0.50% Surfactant) | 4800 | 9 |
| Composition No. 3 (0.75% Surfactant) | 5200 | 7 |
| Composition No. 4 (1.0% Surfactant) | 4700 | 7 |

The above results showed an increase in copper removal rate on the addition of surfactant. Composition No. 2 containing 0.50% surfactant showed optimum copper removal along with minimum residual copper on the wafer after polishing.

Test for Dishing of Copper of a Copper Pattern Wafer

Wafer tested—electroplated copper pattern wafer of silicon dioxide having Sematech 931 mask.

Test Pad—described above.

Tool used for test—Applied Materials Mira polishing machine.

The wafer was polished with the control polishing composition using the following polishing parameters until the end point was detected by the polishing machine:

Down force 5 psi (351.5 g/cm$^2$)

Platen speed—93 rpm

Carrier Speed—87 rpm

Slurry Flow—250 ml/min

After the end point was detected, polishing was continued except the down force was reduced to 3 psi (210.9 g/cm$^2$) until the endpoint trace on the polishing machine flattens (i.e., the slope of the curve is zero). At this point all removal of copper has stopped and no copper is present. The time was recorded for each of the above polishing steps.

The dishing of the copper pattern lines of the wafer was measured on a Tencor P1 profilometer. The 100 um lines in the center of the wafer were measured, the 100 um lines in the middle of the wafer were measured (i.e., half way between the center and edge of the wafer) and the 100 um line near the edge of the wafer were measured (i.e., about 1 inch from the edge of the wafer). Separate wafers as described above were polished under the same conditions with each of the above prepared Polishing Compositions 1–4. The results are shown below in Table 2 for each of the polishing compositions.

TABLE 2

| Polishing Composition | Dishing Center | Dishing Middle | Dishing Edge |
|---|---|---|---|
| Control Composition (0% Surfactant) | 1650 Å | 1800 Å | 1500 Å |
| Composition 1 (0.25% Surfactant) | 1350 Å | 1350 Å | 1300 Å |
| Composition 2 (0.50% Surfactant) | 1550 Å | 1350 Å | 1300 Å |
| Composition 3 (0.75% Surfactant) | 2000 Å | 1350 Å | 1050 Å |
| Composition 4 (1.00% Surfactant) | 900 Å | 1150 Å | 900 Å |

Å-Angstroms

The above results show that there is a significant decrease is dishing of copper lines as the amount of surfactant is increased in the polishing composition.

EXAMPLE 2

Control Polishing Composition 5 was prepared which was identical to the Control Polishing Composition of Example 1 except amount of the polymethacrylic acid polymer blend was reduced by one half. Polishing Compositions 6, 7 and 8 were prepared by the addition of 0.5%, 0.75% and 1.00% respectively of sodium octane sulfonate surfactant. Each of the polishing compositions was tested using the same procedures used in Example 1 to test for copper removal rate and dishing of copper wafers described in Example 1. The results were similar to those of Example 1. Optimum copper removal rate was with Composition 6, which contain 0.5% surfactant. There was a decrease in dishing with Polishing Compositions 7 and 8 that contained an increased amount of surfactant.

EXAMPLE 3

Polishing Compositions A–E were prepared using the Control Composition of Example 1 except that 500 ppm of benzotriazole were used. Various amounts of "Klebosol" (silica abrasive having an average particle size of 12 nm) and "Bio-terge" (sodium octane sulfonate) were added to the polishing compositions. Polishing Composition A contained 1% "Klebosol" (12 nm) and 0% "Bio-terge". Polishing Composition B contained 0% "Klebosol" and 0.20% "Bio-terge". Polishing Composition C contained 0% "Klebosol" and 0.5% "Bio-terge". Polishing Composition D contained 1.0% "Klebosol" and 0.10% "Bio-terge". Polishing Composition E contained 1% "Klebosol" and 0.5% "Bio-terge".

Polishing Compositions A–E were tested for copper removal rate using the procedure described in Example 1. The results are shown in Table 3.

TABLE 3

| Polishing Composition | "Klebosol" (12 nm) | "Bio-terge" | Copper Removal Rate (Angstroms/min.) |
|---|---|---|---|
| A | 1% | 0.0% | 159 |
| B | 0% | 0.20% | 1500 |
| C | 0% | 0.50% | 1700 |
| D | 1% | 0.10% | 2734 |
| B | 1% | 0.50% | 3230 |

Composition A that does not contain "Bio-terge" surfactant had a copper removal rate of 159 A°/min. which indicated that the "Klebosol" was not functioning as an abrasive. Compositions B and C which contained "Bio-terge" surfactant but did not contain "Klebosol" abrasive showed a dramatic increase in the copper removal rate. Compositions D and E which contained both the "Klebosol" abrasive and "Bio-terge" surfactant showed a significant increase in the copper removal rate in comparison to Compositions B and C indicating that the "Klebosol" was functioning as an abrasive and that "Bio-terge" was a necessary constituent to achieve a significant improvement of copper removal rate.

EXAMPLE 4

Polishing Compositions F–J were prepared using the same Polishing Composition A–E of Example 3 except that aluminum oxide abrasive was substituted for the "Klebosol" abrasive used in Example 3. Polishing Composition F contained 1% aluminum oxide abrasive and 0% "Bio-terge". Polishing Composition G contained 0% aluminum oxide abrasive and 0.20% "Bio-terge". Polishing Composition H contained 0% aluminum oxide abrasive and 0.5% "Bio-terge". Polishing Composition I contained 1.0% aluminum oxide abrasive and 0.10% "Bio-terge". Polishing Composition J contained 1% "aluminum oxide abrasive and 0.5% "Bio-terge".

Polishing Compositions F–J were tested for copper removal rate using the procedure described in Example 1. The results are shown in Table

TABLE 4

| Polishing Composition | "Aluminum Oxide Abrasive | "Bio-terge" | Copper Removal Rate (Angstroms/min.) |
|---|---|---|---|
| F | 1% | 0.0% | 75 |
| G | 0% | 0.20% | 1500 |
| H | 0% | 0.50% | 1700 |
| I | 1% | 0.10% | 4474 |
| J | 1% | 0.50% | 4606 |

Composition F that does not contain "Bio-terge" surfactant had a copper removal rate of 75 A°/min. which indicated that the aluminum oxide was not functioning as an abrasive. Compositions G and H which contained "Bio-terge" surfactant but did not contain aluminum oxide abrasive showed a dramatic increase in the copper removal rate. Compositions I and J which contained both the aluminum oxide abrasive and "Bio-terge" surfactant showed significant increase in the copper removal rate in comparison to Compositions G and H indicating that the aluminum oxide was functioning as an abrasive and that "Bio-terge" was a necessary constituent to achieve a significant improvement of copper removal rate.

What is claimed is:

1. An aqueous polishing composition used for the chemical mechanical polishing of metal on semiconductor substrates, the composition comprising:
    (a) a carboxylic acid polymer having a number average molecular weight of about 20,000 to 1,500,000
    (b) 1 to 15% by weight of an oxidizing agent,
    (c) 50 to 5,000 ppm (pans per million) of a corrosion inhibitor,
    (d) up to 3.0% by weight of a complexing agent,
    (e) 0.1 to 5.0% by weight of a surfactant, and
    (f) a pH under 5.0.

2. The aqueous polishing composition of claim 1 wherein the surfactant is art alkali metal organic sulfonate.

3. The aqueous polishing composition of claim 2 wherein the surfactant is sodium octane sulfonate.

4. The aqueous polishing composition of claim 3 wherein the inhibitor is an aromatic compound.

5. The aqueous polishing composition of claim 4 wherein the inhibitor is benzotriazole.

6. The aqueous polishing composition of claim 5 containing 0.01 –3.0% by weight of abrasive particles.

7. The aqueous polishing composition of claim 1 in which the carboxylic acid polymer consists essentially of a blend of poly(meth)acrylic acid having a number average molecular weight of 20,000 to 100,000 and a poly(meth)acrylic acid having a number average molecular weight of 200,000 to 1,500,000.

8. The aqueous polishing composition of claim 7 in which the carboxylic acid polymer consists essentially of a blend of poly(meth)acrylic acid having a number average molecular weight of 30,000 and a poly(meth)acrylic acid having a number average molecular weight of 250,000in a 1:1 weight ratio.

9. The aqueous polishing composition of claim 1 wherein the oxidizing agent is hydrogen peroxide.

10. The aqueous polishing composition of claim 1 wherein the complexing agent comprises 0.1 –1.0% by weight of the composition and includes malic acid.

11. The aqueous polishing composition of claim 1 in which the carboxylic acid polymer consists essentially of a blend of poly(meth)acrylic acid having an average molecular weight of 30,000 and a poly(meth)acrylic acid having an average molecular weight of 250,000 in a 1:1 weight ratio, the oxidizing agent is hydrogen peroxide, the complexing agent is malic acid, and the surfactant is sodium octane sulfonate.

12. A method of polishing a surface of a semiconductor wafer having metal comprising the steps of:

(a) providing a polishing pad having a polishing surface, (b) holding said wafer in a carrier such that the surface of the wafer is in contact with the polishing surface of polishing pad, (c) moving said carrier to provide both pressure on the surface of the wafer and relative lateral motion between the surface of the wafer and the polishing surface; and (d) providing an aqueous polishing composition at an interface between the surface of the wafer and the polishing surface, wherein the composition comprises:
a carboxylic acid polymer comprising polymerized unsaturated carboxylic acid monomers having an average molecular weight of about 20,000 to 1500,000:1 to 15% by weight of an oxidizing agent: 50–5,000 ppm (pans per million) of a corrosion inhibitor: up to 3.0% by weight of a complexing agent; 0.1 to 5.0% by weight of a surfactant, and a pH under 5.0

13. An aqueous composition, for chemical mechanical polishing of metal on a semiconductor substrate, the aqueous composition comprising:

a pH no higher than 5, an oxidizer of the metal at said pH to provide ions of the metal, a complexing agent to dissolve the ions, a carboxylic acid polymer reactive with the metal, and a combination of a metal corrosion inhibitor and a surfactant.

14. The aqueous composition of claim 13 wherein the surfactant is an anionic surfactant.

15. The aqueous composition of claim 13 wherein the surfactant is a sulfonate surfactant comprised of molecules having at least six carbon atoms.

16. The aqueous composition of claim 13 wherein the surfactant is an alkali metal organic sulfonate.

* * * * *